United States Patent
Heitzmann

(10) Patent No.: US 6,478,321 B1
(45) Date of Patent: Nov. 12, 2002

(54) RUBBER SHEAR SPRING ASSEMBLY FOR TANDEM AXLE TRAILER

(75) Inventor: David E. Heitzmann, Union, MI (US)

(73) Assignee: MOR/ryde International, Inc., Elkhart, IN (US)

( * ) Notice: Subject to any disclaimer, the term of this patent is extended or adjusted under 35 U.S.C. 154(b) by 0 days.

(21) Appl. No.: 09/631,243

(22) Filed: Aug. 2, 2000

(51) Int. Cl.$^7$ ............................................... B60G 11/24
(52) U.S. Cl. ..................... 280/124.177; 280/124.17; 280/124.175; 280/124.172; 280/676; 280/687; 267/219; 267/229
(58) Field of Search ................. 280/124.177, 124.178, 280/124.17, 124.175, 124.172, 676, 687; 267/36.1, 7, 219, 222, 224, 229, 230

(56) References Cited

U.S. PATENT DOCUMENTS

| | | | |
|---|---|---|---|
| 1,893,695 A | * 1/1933 | Chenoweth | 280/682 |
| 3,482,852 A | * 12/1969 | Hickman | 280/124 |
| 3,830,516 A | * 8/1974 | Hickman | 280/124 |
| 3,833,236 A | * 9/1974 | Davis et al. | 280/104.5 |
| 3,929,347 A | * 12/1975 | Masser | 280/104.5 |
| 4,033,606 A | * 7/1977 | Ward et al. | 280/682 |
| 4,213,633 A | * 7/1980 | Moore | 280/716 |
| 4,502,707 A | * 3/1985 | Jable et al. | 280/682 |
| 4,846,495 A | * 7/1989 | Laidely | 280/680 |
| 4,995,636 A | * 2/1991 | Hall et al. | 180/716 |
| 5,465,997 A | * 11/1995 | Heitzmann | 280/716 |
| 5,676,356 A | * 10/1997 | Ekonen et al. | 267/294 |
| 5,732,970 A | * 3/1998 | Heitzmann | 280/717 |
| 5,820,149 A | * 10/1998 | Sobina | 280/124.128 |
| 5,899,470 A | * 5/1999 | Heitzmann | 280/86.751 |
| 6,176,478 B1 | * 1/2001 | Heitzmann | 267/269 |

FOREIGN PATENT DOCUMENTS

DE    2846608    5/1979

OTHER PUBLICATIONS

MOR/ryde International, Inc.; MOR/ryde "RL" Suspension Kit, undated, 1 sheet (2 sides).

* cited by examiner

*Primary Examiner*—Eric Culbreth
*Assistant Examiner*—Deanna Draper
(74) *Attorney, Agent, or Firm*—Joseph P. Gastel

(57) ABSTRACT

A rubber shear spring assembly for mounting between inner ends of adjacent leaf springs of a tandem axle including a hanger for mounting on a vehicle frame, hanger sides on the hanger, a rubber shear spring assembly between the hanger sides, the rubber shear spring assembly including a central plate and first and second rubber shear springs having inner sides mounted on opposite sides of the central plate and the rubber shear springs having outer sides mounted on the hanger sides, and connector members mounted at opposite ends of the central plate for connection to the inner ends of adjacent leaf springs.

15 Claims, 5 Drawing Sheets

RUBBER SHEAR SPRING ASSEMBLY FOR TANDEM AXLE TRAILER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to a rubber shear spring assembly for a tandem axle trailer.

By way of background, in tandem axle trailers, of the type known as fifth wheels, the inner ends of leaf springs are coupled to each other by mechanical linkages. However, these mechanical linkages permit only limited vertical movement of the inner ends of the leaf springs.

BRIEF SUMMARY OF THE INVENTION

It is one object of the present invention to provide a rubber shear spring assembly for mounting the inner ends of leaf springs of a tandem axle trailer so as to permit greater vertical movement of the inner ends of the leaf springs to thereby provide a softer ride than previously obtainable by the mechanical linkages. Other objects and attendant advantages of the present invention will readily be perceived hereafter.

The present invention relates to a tandem axle trailer having a frame, first and second axles extending crosswise to said frame, first leaf springs mounted on opposite ends of said first axle, second leaf springs mounted on opposite ends of said second axle, inner and outer ends on said first and second leaf springs, and brackets mounting said outer ends of said first and second leaf springs on said frame, the improvement comprising first and second hangers mounted on said frame between said inner ends of said first and second leaf springs, first and second rubber shear springs mounted on said first and second hangers, respectively, said inner ends of one of said first and second leaf springs being coupled to said first shear spring, and said inner ends of the other of said first and second leaf springs being coupled to said second rubber shear spring.

The present invention also relates to a rubber shear spring assembly for mounting between adjacent leaf springs of tandem axles comprising a hanger, hanger sides on said hanger, a central plate between said hanger sides, first and second rubber shear springs, first sides on said first and second rubber shear springs secured to said central plate, second sides on said first and second rubber shear springs secured to said hanger sides, and first and second connector members on said central plate.

The various aspects of the present invention will be more readily understood when the following portions of the specification are read in conjunction with the accompanying drawings wherein:

DETAILED DESCRIPTION OF THE INVENTION

Figure 1:
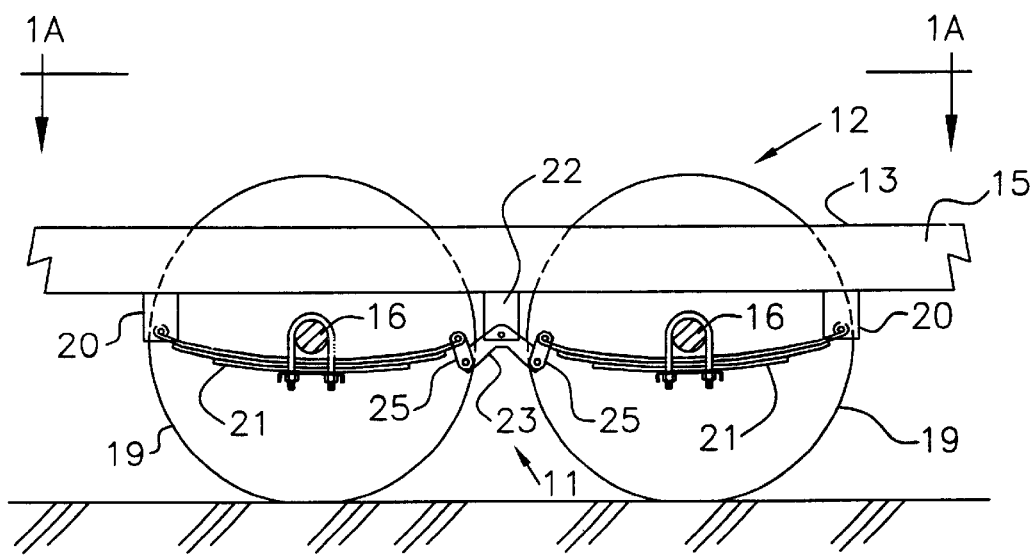
FIG. 1 is a fragmentary cross sectional view taken substantially along line 1—1 of FIG. 1A of a prior art mounting for the inner ends of leaf springs on one side of a tandem axle trailer.
Figure 2:
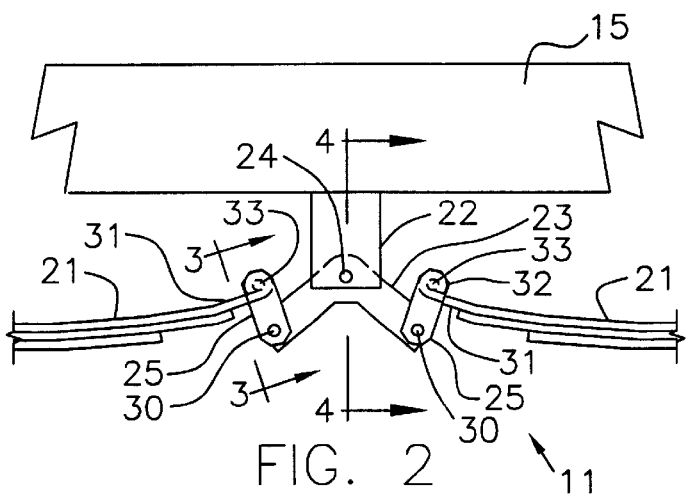
FIG. 2 is a fragmentary enlarged view of the prior art structure for mounting the inner ends of the leaf springs of FIG. 1.
Figure 3:
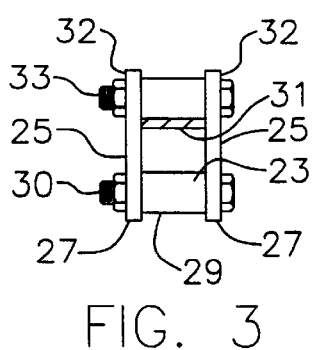
FIG. 3 is an enlarged cross sectional view taken substantially along line 3—3 of FIG. 2.
Figure 4:
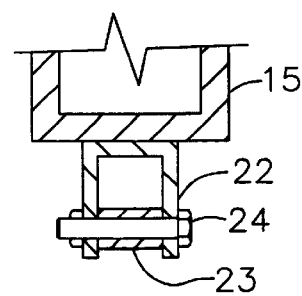
FIG. 4 is a fragmentary enlarged cross sectional view taken substantially along line 4—4 of FIG. 2.
Figure 1A:
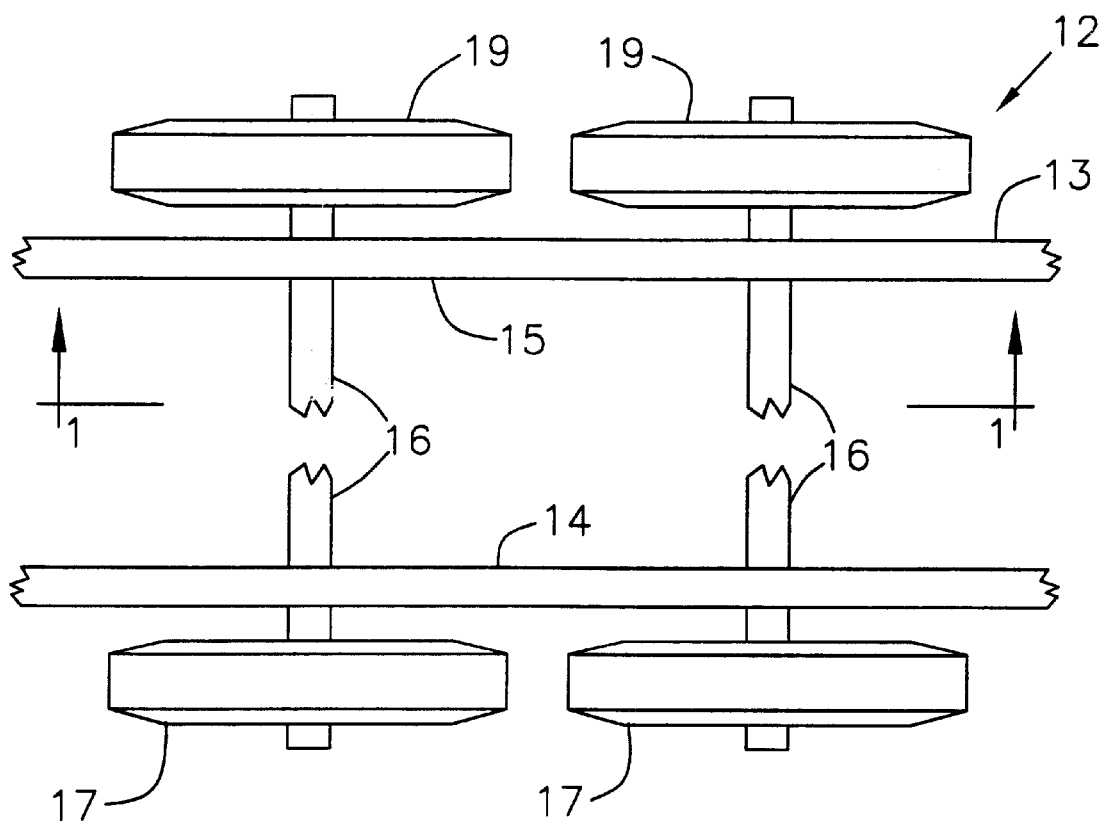
FIG. 1A is a fragmentary plan view taken substantially in the direction of arrows 1A—1A of FIG. 1.
Figure 5:
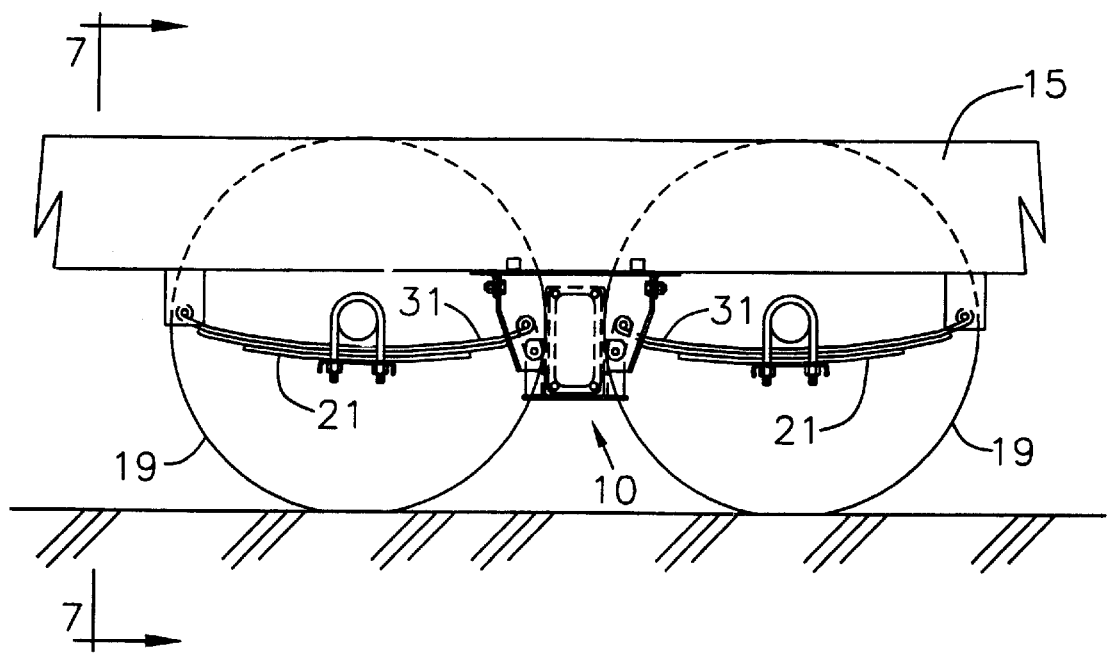
FIG. 5 is a fragmentary side elevational view taken substantially along line 5—5 of FIG. 7 showing a pair of wheels of a tandem axle trailer with their inner ends mounted on the rubber shear spring assembly of the present invention.
Figure 6:
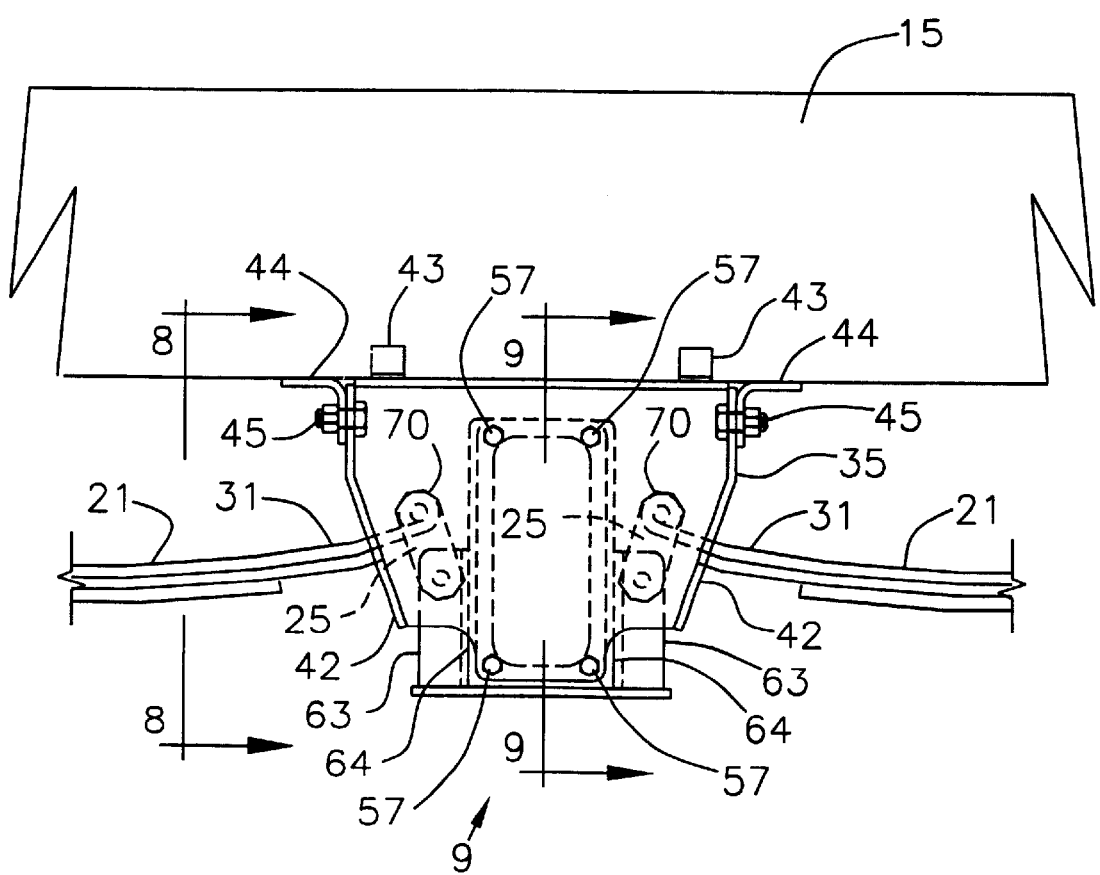
FIG. 6 is an enlarged fragmentary view of a portion of FIG. 5, with parts omitted, showing the rubber shear spring assembly for mounting the inner ends of the leaf springs of a tandem axle trailer.
Figure 7:
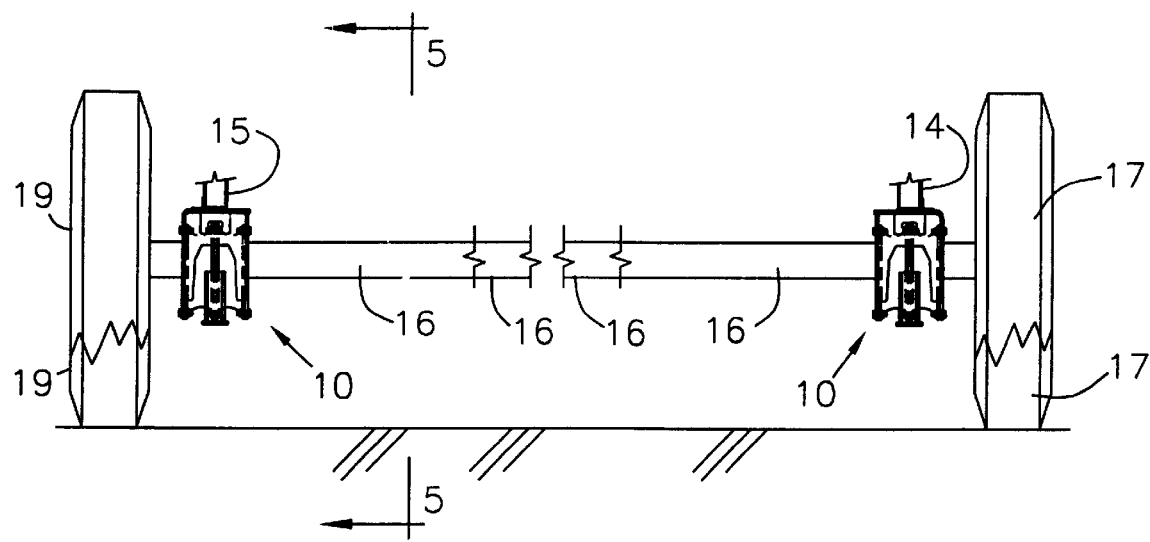
FIG. 7 is a fragmentary cross sectional view taken substantially along line 7—7 of FIG. 5.

Summarizing briefly in advance, the rubber shear spring assembly 10 (FIGS. 5–10) of the present invention, which is used on tandem axle assemblies, is intended to replace the prior art linkage 11 (FIGS. 1–4). The prior art linkage was strictly of metal and therefore did not have the advantage of the rubber shear spring assembly of the present invention which provides more vertical travel and thus produces a less harsh ride. In addition, the rubber shear spring assembly has a certain amount of lateral flexibility and therefore can absorb side forces on the wheels to a limited extent.

The prior art tandem axle trailer construction 12 (FIGS. 1–4 and 1A) includes a vehicle frame 13 having spaced frame members 14 and 15. Identical suspensions are mounted on frame members 14 and 15 to support wheels 17 on frame member 14 and wheels 19 on frame member 15. The suspension includes inverted U-shaped brackets 20 suitably secured to the underside of each frame member 15 and 14 for pivotally supporting the outer ends of leaf springs 21 in the conventional manner. The suspension also includes inverted U-shaped bracket 22 (FIG. 4) which pivotally supports link 23 at pin 24. Shackle plates 25 (FIGS. 2 and 3) have their lower ends 27 pinned to the outer ends 29 of link 23 by pins 30, and the inner ends 31 of leaf springs 21 are pivotally mounted on the upper ends 32 of shackle plates 25 by pins 33. As noted briefly above, as the tandem axle trailer 12 travels, link 23 may pivot on bracket 22 and shackle plates 25 may pivot on the outer ends of link 23. While only the suspension associated with frame member 15 has been shown, it will be appreciated that the suspension on frame member 14 is identical.

In accordance with the present invention, a rubber shear spring assembly 10 is substituted on each of the frame members 15 and 14 for the linkage 11 described above relative to FIGS. 1–4. The rubber shear spring assembly 10 will permit more vertical movement of the inner ends 31 of leaf springs 21 and therefore provide a softer ride than the strictly mechanical linkage 11 of FIGS. 1–4.

The rubber shear spring assembly 10 includes a frame hanger assembly 35 consisting of a top plate 37 which is bent over to form a side 39. A side plate 40, which has the same shape as side plate 39, has its upper end welded to the top plate 37 at 41. End plates 42 of identical construction are suitably welded to the edges of side plates 39 and 40 and to the edges of top plate 37. Top plate 37 has the horizontal legs of angles 43 welded thereto and the vertical legs of angles 43 abut the side of frame member 15 (FIGS. 6, 8 and 9) to locate the frame hanger assembly 35 relative to trailer frame member 15. The frame hanger assembly 35 is bolted to brackets 44 (FIG. 6) by bolts 45, brackets 44 being welded to the underside of trailer frame member 15. The vertical leg 47 (FIG. 8) of bracket 44 includes a slot 49 which permits the bolt 45 to pass therethrough and also pass through aperture 50 (FIGS. 8 and 10) in each end wall 42. Bolt 45 is not shown in FIG. 8.

The rubber shear spring assembly 10 also includes a pair of rubber shear springs 51 (FIGS. 8–10) mounted in mirror image relationship on hanger walls 39 and 40. In this respect, rubber shear spring 51 includes a rubber block 52 having metal plates 53 bonded to their inner sides thereof and metal plates 54 bonded to their outer sides thereof. Metal plates 54 have four apertures 55 at the corners thereof, and bolts 57 pass through apertures 55 and bores 59 in frame hanger assembly sides 39 and 40 to thereby mount the rubber shear springs 51 on frame hanger assembly 35.

The rubber shear spring assembly 10 also includes a spring carrier assembly 60 having a central plate 61 which has its lower edge welded to plate 62. U-shaped connector members 63 have their lower edges welded to plate 62 and their vertical sides welded to the side edges of plate 61 at 64. Inner plates 53 of rubber shear springs 51 each have four holes 65 at the corners thereof. Central plate 61 has four holes 67 at the four corners thereof which are placed in alignment with holes 65 of plates 53 and four bolts 69 pass through aligned sets of holes 65, 67, 65 to secure inner rubber shear spring plates 53 to central plate 61 of the spring carrier assembly.

Figures 8, 9:
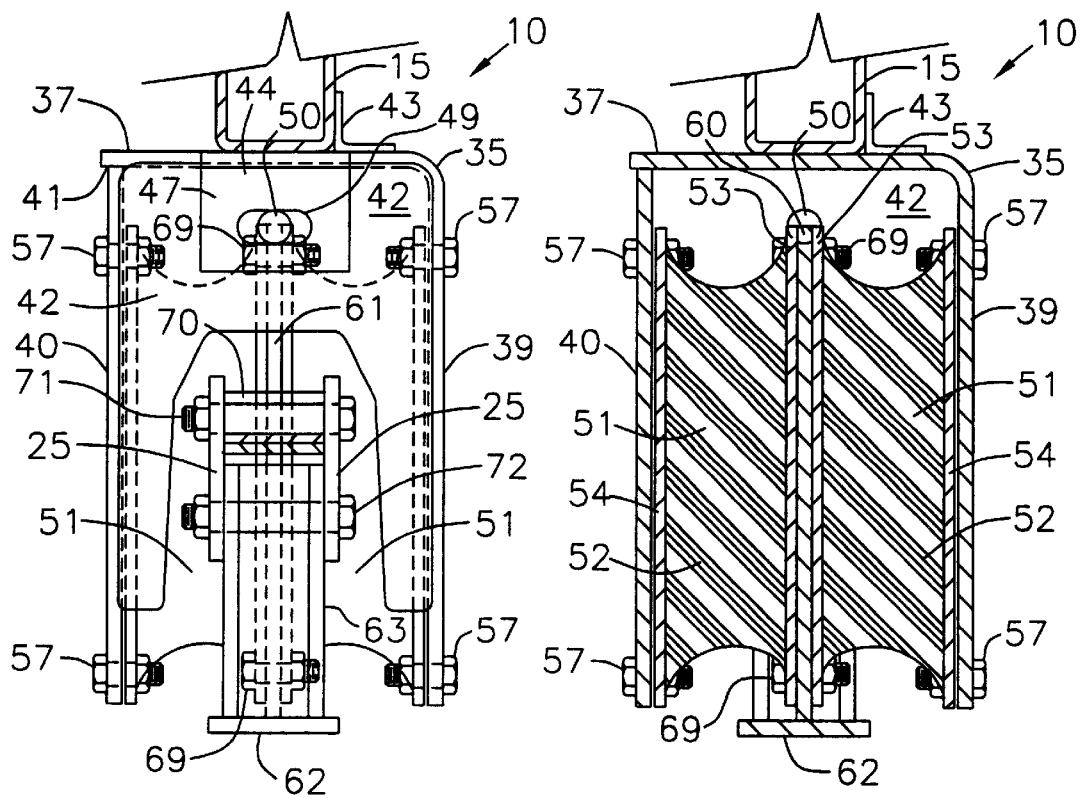
FIG. 8 is an enlarged fragmentary cross sectional view taken substantially in the direction of arrows 8—8 of FIG. 6 with certain parts omitted and showing an end view of the rubber shear spring assembly for mounting the inner ends of the leaf springs of a tandem axle trailer.
FIG. 9 is an enlarged cross sectional view taken substantially along line 9—9 of FIG. 6 and showing the rubber shear springs mounted within the rubber shear spring carrier hanger and mounting the central plate which carries the inner ends of the leaf springs.
Figure 10:
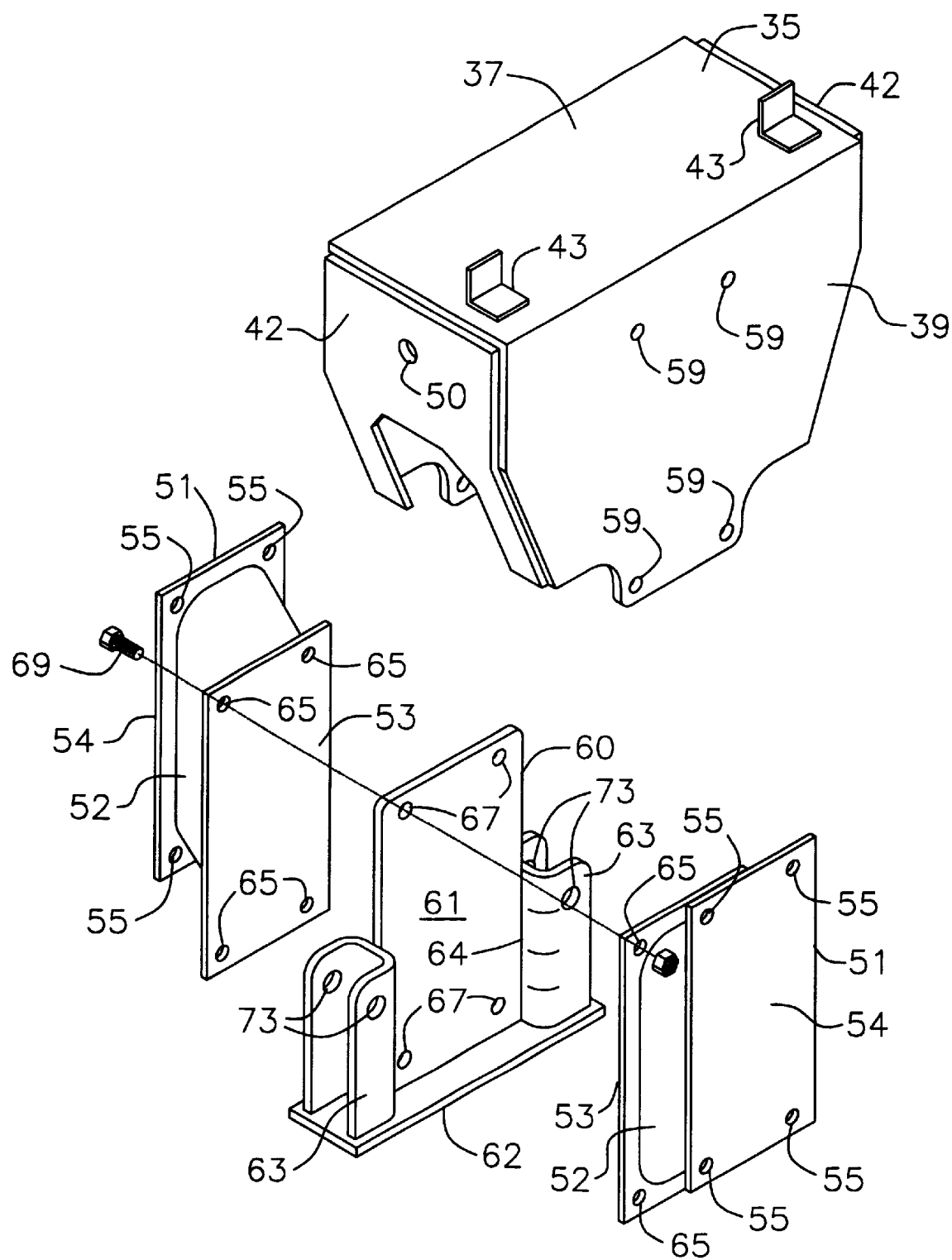
FIG. 10 is an exploded view showing the various components of the rubber shear spring assembly for mounting between adjacent leaf springs of a tandem axle.

The eyes 70 on the inner ends 31 of leaf springs 21 are mounted between shackle plates 25 by bolt assemblies 71. The lower ends of shackle plates 25 are mounted on the legs 66 of the U-shaped members 63 by bolts 72 which pass through bores in the lower ends of shackle plates 25 and through aligned bores 73 in the legs 66 of the U-shaped members 63. While only one connection of the foregoing type is shown in FIG. 8, it will be appreciated that this type of connection is associated with each U-shaped member 63.

While preferred embodiments of the present invention have been disclosed, it will be appreciated that it is not limited thereto but may be otherwise embodied within the scope of the following claims.

What is claimed is:

1. In a tandem axle trailer having a frame, first and second axles extending crosswise to said frame, first leaf springs mounted on opposite ends of said first axle, second leaf springs mounted on opposite ends of said second axle, inner and outer ends on said first and second leaf springs, brackets mounting said outer ends of said first and second leaf springs on said frame, the improvement comprising first and second rubber shear spring assemblies mounted on said frame at said inner ends of said first and second leaf springs, said first and second rubber shear spring assemblies including first and second hangers, respectively, first and second rubber shear springs mounted on said first and second hangers, respectively, said inner ends of one of said first and second leaf springs being coupled to said first shear spring assembly, and said inner ends of the other of said first and second leaf springs being coupled to said second rubber shear spring assembly.

2. In a tandem axle trailer as set forth in claim 1 wherein said first and second rubber shear spring assemblies each include a central plate, rubber shear springs having inner sides secured to each of said central plates and outer sides secured to said first and second hangers, and shackle plates mounted between said each of said central plates and said inner ends of said first and second leaf springs.

3. In a tandem axis trailer as set forth in claim 2 including a U-shaped connector member having a vertical side connected to each opposite end of each of said central plates, and wherein said shackle plates are secured to each of said U-shaped connector members.

4. In a tandem axis trailer as set forth in claim 3 wherein said U-shaped connector members include spaced legs, and bores in said spaced legs.

5. In a tandem axle trailer as set forth in claim 1 wherein each of said first and second rubber shear spring assemblies include a central plate having opposite ends, first and second connector members mounted on opposite ends of each of said central plates, and wherein said inner ends of said first leaf springs are coupled to said first connector members, and wherein said inner ends of said second leaf springs are coupled to said second connector members.

6. In a tandem axle trailer as set forth in claim 5 wherein said inner ends of said first and second leaf springs are coupled to said first and second connector members by shackle plates.

7. In a tandem axis trailer as set forth in claim 6 wherein said U-shaped connector members include spaced legs, and bores in said spaced legs.

8. In a tandem axis trailer as set forth in claim 7 wherein said shackle plates are secured to said spaced legs by bolts which extend through said bores.

9. In a tandem axis trailer as set forth in claim 5 wherein said first and second connector members are U-shaped having vertical sides connected to opposite ends of said central plates.

10. In a tandem axis trailer as set forth in claim 9 wherein said U-shaped connector members include spaced legs, and bores in said spaced legs.

11. A rubber shear spring assembly for mounting between adjacent leaf springs of tandem axles comprising a hanger, hanger sides on said hanger, a central plate between said hanger sides, first and second rubber shear springs, first sides on said first and second rubber shear springs secured to said central plate, second sides on said first and second rubber shear springs secured to said hanger sides, first and second connector members on said central plate, outer ends on said central plate, said connector members being mounted on said outer ends of said central plate, and first and second shackle plates mounted on said first and second connector members, respectively.

12. A rubber shear spring assembly as set forth in claim 11 wherein said first and second rubber shear springs include first metal plates bonded to said first sides and second metal plates bonded to said second sides, and wherein said first metal plates are secured to opposite sides of said central plate, and wherein said second metal plates are secured to said hanger sides.

13. A rubber shear spring assembly for mounting between adjacent leaf springs of tandem axles comprising a hanger, hanger sides on said hanger, a central plate between said hanger sides, first and second rubber shear springs, first sides on said first and second rubber shear springs secured to said central plate, second sides on said first and second rubber shear springs secured to said hanger sides, first and second connector members on said central plate, said first and second rubber shear springs including first metal plates bonded to said first sides and second metal plates bonded to said second sides, said first metal plates being secured to opposite sides of said central plate, said second metal plates being secured to said hanger sides, said connector members being U-shaped, and vertical sides on said connector members welded to opposite ends of said central plate.

14. A rubber shear spring assembly as set forth in claim 13 wherein said U-shaped members each include spaced legs, and aligned bores in said spaced legs.

15. A rubber shear spring assembly for mounting between adjacent leaf springs of tandem axles comprising a hanger, hanger sides on said hanger, a central plate between said hanger sides, first and second rubber shear springs, first sides on said first and second rubber shear springs secured to said central plate, second sides on said first and second rubber shear springs secured to said hanger sides, and means on said central plate for connecting said central plate to the inner ends of adjacent leaf springs.

* * * * *